United States Patent Office 2,784,039
Patented Mar. 5, 1957

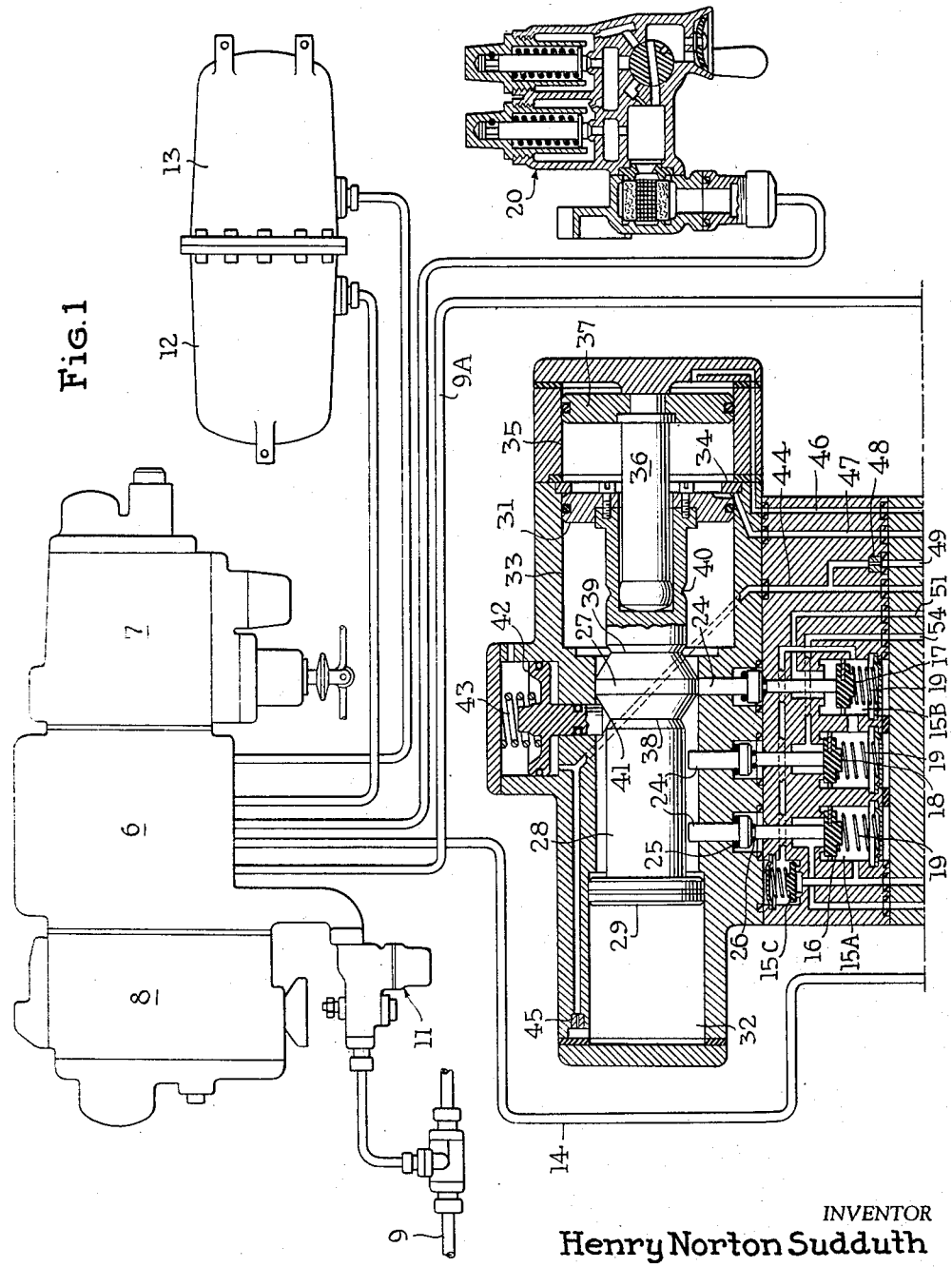

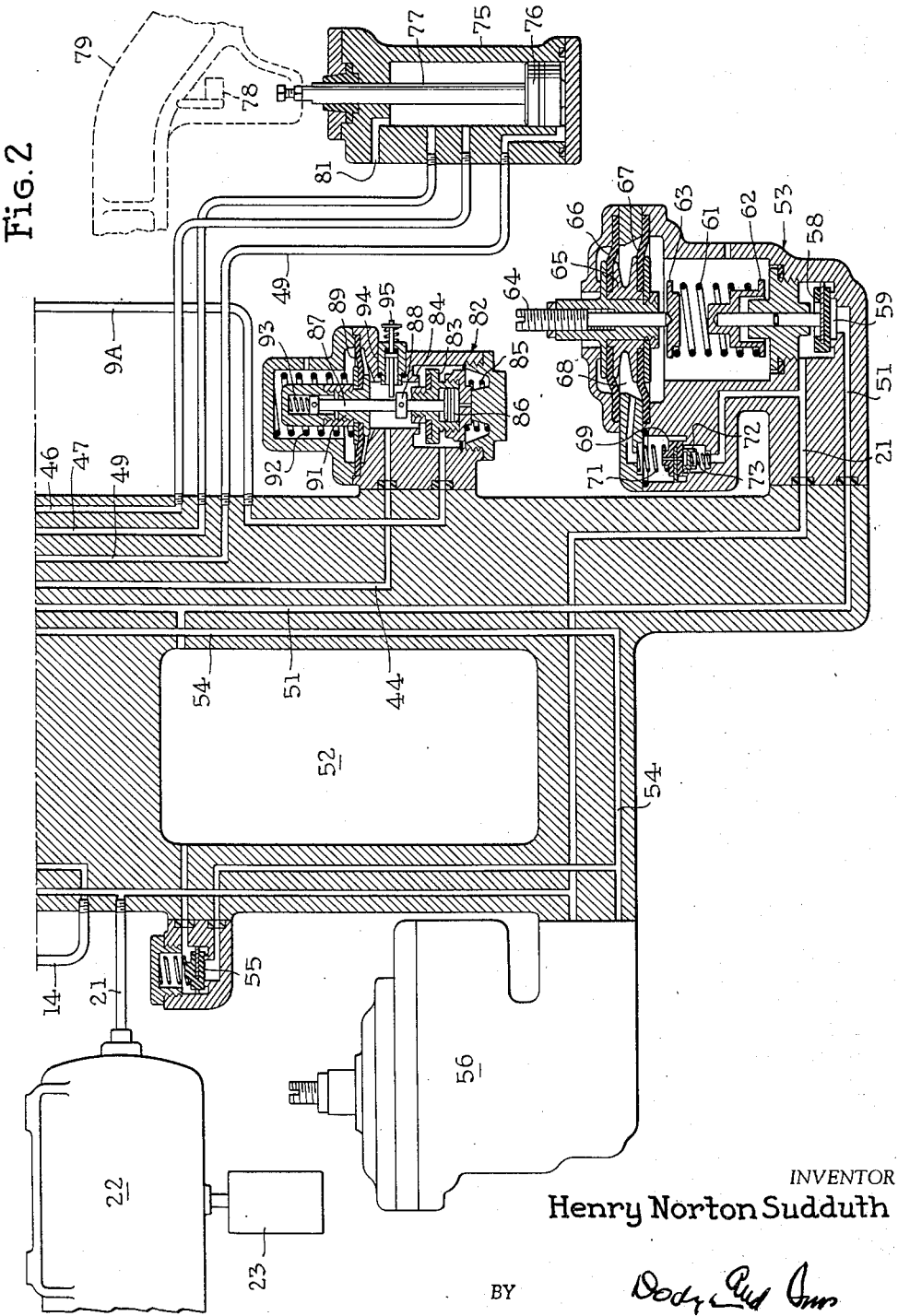

2,784,039

THREE STAGE LOAD COMPENSATING BRAKE

Henry Norton Sudduth, Watertown, N. Y., assignor to The New York Air Brake Company, a corporation of New Jersey Application June 13, 1955, Serial No. 515,136

4 Claims. (Cl. 303—22)

This invention relates to multiple position, empty-and-load valves for use with automatic air brakes, particularly freight car brakes.

Two-position empty-and-load brakes have long been in use on type of freight cars that carry bulk loads and are almost invariably empty or fully loaded. The respond to the relative positions assumed under varying load by two parts of a truck suspension, commonly the truck frame, and the spring-mounted truck bolster.

Steadily increasing operating speeds and greater disparity between empty and loaded weights of the type of freight car susceptible to highly variable loading have created a condition requiring adjustment of braking force in relation to load (load compensation) better than can be attained by any two-position empty-and-load brake.

An application of Ross and Safford, Serial Number 444,896, filed July 21, 1954, issued January 3, 1956, as Patent 2,729,515, discloses a three-position valve i. e., one which establishes braking forces at three basic levels using a 12 inch plain cylinder. The selector valve uses principles of proven practicality.

One of the important features was the use of two proportioning valves, one for empty and the other for intermediate load conditions, with means to afford an independent exhaust path around the proportioning valves.

The present invention relates to this exhaust path and provides better releasing action in both empty and intermediate settings and also when the retainer is set. The compensating volumes characteristic of the Safford and Ross invention are used, and so also is the improved proportioning valve.

The invention will now be described by reference to the accompanying drawings which show the AB valve and reservoirs on a smaller scale than the related load mechanism, the latter being shown in vertical section and diagrammatically to the extent that the ports are shown as if they lay all in the plane of section.

Fig. 1 shows the AB valve, its reservoir, brake pipe and connections in elevation and the selector valve mechanism with its connections in axial section.

Fig. 2 shows the brake cylinder in fragmentary elevation, a portion of a truck frame in elevation in broken lines, and in vertical section, the weighing valve, cut-off valve, two proportioning valves, the compensating volume, and appropriate pipes and passages.

Figs. 1 and 2 when assembled, one above the other, afford a diagram of the essential brake equipment for one car.

All statements of direction refer to parts as positioned in Figs. 1–2.

It is contemplated that the invention will be used with the AB brake and it is illustrated as so used. The AB brake is in current use and, in the present disclosure, typifies any valve involving the triple valve principle in conjunction with the displacement type of automatic air brake.

The pipe bracket 6 carries the service portion 7 and the emergency portion 8. The brake pipe 9 is connected to the bracket 6 through a branch pipe in which is inserted a standard dust collector and cut-out cock 11. The emergency reservoir 12 and auxiliary reservoir 13 are connected by pipes to the bracket 6. Pipe 14 is the brake cylinder connection which in conventional AB installations leads directly to the brake cylinder, but here leads through the empty-and-load mechanism of the present invention. The connection 9A is in free communication with the brake pipe 9. A conventional four-position retainer 20 is shown at the end of the usual retainer pipe.

To simplify description and avoid multiplying reference numerals, a single numeral will be used to designate any continuous passage and any pipe in free communication with such a passage. Since the commercial embodiment will differ somewhat in arrangement from the diagrammatic showing, the sectional construction of the housings (though indicated schematically in the drawings) will not be elaborated in the description. Accepted commercial practices will, of course, be used, and nothing deemed patentable is involved.

The brake cylinder connection leads to chamber 15A which is in one way communication with chamber 15B past a lightly loaded check valve 15C. This check valve permits practically free flow from 15A to 15B and prevents flow in the reverse direction. Chamber 15B is in effect a single space, being two valve chambers which freely communicate.

There are three selectively opened poppet valves, namely a "load" valve 16 which when held open allows flow from chamber 15A, also an "empty" valve 17 and an "intermediate" valve 18 each controlling a flow from 15B. Each of these three valves is urged toward its seat by pressure in the related chamber 15A or 15B, and by respective ones of the three light coil compression springs 19. Since valve 16 controls exhaust flow, its spring 19 should be very light.

Cylinder 22 is equipped with any usual slack adjuster, diagrammatically indicated at 23.

The valves 16, 17 and 18 are identical, and each is forced open by one of three identical tappets 24. These are sealed against leakage both in their valve-open and valve-closed positions by one or the other of the gaskets 25, 26 which encircle each of them and which are identified by these numbers on the tappet for valve 16.

The valves 16, 17, 18 are held open selectively by the annular lobe 27 in rod 28 which rod connects "reset" piston 29 with the larger load-setting piston 31. Piston 29 is called the reset piston, because in the first phase of every load-weighing operation piston 29 is forced all the way to the right until "empty" position (shown in Fig. 1) is reached. After this the weighing operation proceeds, as will later be described.

Reset piston 29 works in a cylinder 32 closed at its left-hand end and load setting piston 31 works in a cylinder 33 of larger diameter than cylinder 32. A stop ring 34 is clamped between the main housing and an extension thereof. The latter encloses a coaxial cylinder 35, which is closed at its right-hand end and conveniently is of the same diameter as cylinder 33. Ring 34 limits the leftward motion of piston 37. The space between pistons 29 and 31 is vented to atmosphere.

The right-hand end of rod 28 has a counterbore to receive the end of rod 36 attached to the intermediate setting piston 37 which works in cylinder 35. Rod 36 is dimensioned to limit the approach of pistons 31 and 37 to one another. On opposite sides of lobe 27 are annular grooves 38, 39 which are engaged by the nose 41 on the stem of latch-piston 42. A third groove 40 is located on stem 28 further to the right. Piston 42 is biased downward to latch-engaging position by spring 43.

Piston 42 works in a cylinder as shown. The space above the piston is vented to atmosphere and the space below the piston is in free communication with passage 44. The cylinder space 32 to the left of reset piston 29 communicates with passage 44 through a choke 45.

The parts are proportioned as will now be described.

In "empty" position (shown in Fig. 1) pistons 31 and 37 are to the right as far as they go, and nose 41 engages in groove 38. This position is reached by admitting pressure fluid to cylinder 32 to the left of piston 29. The pressure fluid arrives from the brake pipe via passage 44 and choke 45, so latch piston 42 will first be lifted.

In "intermediate" position lobe 27 depresses the tappet for valve 18 and latch nose 41 is in groove 39. This position is reached by admitting pressure fluid via passage 46 to the right side of piston 37 which is arrested by stop ring 34 with the parts positioned as stated.

In "load" position lobe 27 depresses the tappet for valve 16 and latch nose 41 is in groove 40. This position is reached by admitting pressure fluid to both passages 46 and 47 so that both pistons 31 and 37 are urged to the left, and piston 31 moves to the left to its limit of motion.

As will later appear more clearly, passages 46 and 47 are each fed from passage 44 through a choke 48, passage 49 and the weighing cylinder. Hence, latch nose 41 is retracted before the shift to either "intermediate" or "load" position commences.

The valves 16, 17 and 18 control flows from line 14 toward the brake cylinder. They open selectively as to such flows. When valve 16 is open the flow is free in both directions.

When valve 17 is open the flow is one-way (because of valve 15C) via passage 51 (which is in free communication with compensating volume 52) and then through the proportioning valve 53 to brake cylinder passage 21. Valve 53 is set to afford a proportionally reduced brake cylinder pressure appropriate to an empty car.

When valve 18 is open, the flow is via passage 54 which communicates through check valve 55 with compensating volume 52. Passage 54 communicates with brake cylinder passage 21 through a proportioning valve 56, set to proportion an intermediate brake cylinder pressure.

Respective proportioning valves close when pressures in their discharge sides rise to a characteristic fraction of the pressure on their supply sides. For each valve the characteristic fraction is determined by the relative proportions of two diaphragms which form a differential pressure motor. Though each proportioning valve discharges to passage 21, neither can interfere when valve 16 is open; nor can they interfere with one another because they are set for different fractional reductions. When valve 17 is open, check valve 55 isolates passage 54 from compensating volume 52. When valve 18 is open, valve 53 would close while 56 was still open and so would not interfere with the control effected when 56 closed.

With a 12 inch plain brake cylinder limited to 5 inch travel, full equalization with standard reservoir volumes would be reached at 50 p. s. i. in pipe 14 in all three settings of the selector valve if volume 52 were 365 cu. in. and connected in "light" position and if it were 300 cu. in. and connected in "intermediate" position. A single volume between 300 and 365 cu. in. (325 cu. in. has been used successfully) gives a close enough approximation to full equalization at 50 p. s. i. for all practical purposes, and is shown in Fig. 2.

The proportioning valves 53 and 56 are functionally similar. Mechanically they differ only in that the differentials between diaphragm areas are so chosen that the valves 53 and 56 afford different proportional pressure reductions.

Only valve 53 is shown in section and a description of it will suffice.

The flow-controlling valve is a poppet valve 58 which opens in the direction of flow from passage 51 through valve-seat 59 to brake-cylinder passage 21. There is no reverse flow. The valve 58 is moved in the closing direction by force developed through a coil compression spring 61 confined between a spring seat 62, which is in thrust relation to valve 58, and a spring-seat 63 which is sustained by adjustable thrust screw 64. The screw 64 is mounted in the hub 65 which connects the centers of two diaphragms 66, 67 of unequal areas whose peripheries are clamped in the housing of the valve structure.

The upper and smaller diaphragm 66 is exposed to atmospheric pressure on its upper face, whereas the lower diaphragm 67 is similarly exposed on its lower face. The space 68 between the diaphragms is exposed to pressure in brake cylinder connection 21, but the connection which so exposes it is preferably not a free one. Instead, a valve 69 loaded by spring 71 is used to produce a pressure drop such that pressure in passage 21 must reach about 9 p. s. i. before proportioning starts. This is to ensure that the brake piston will start to move before proportioning starts. To permit back flow from chamber 68 a reversely set check valve 72, lightly loaded by spring 73, controls a bleed port, which conveniently can lead through valve 69.

The spring 61 affords a thrust connection between hub 65 and valve 58. It is convenient but not strictly necessary that this connection be elastic.

Valve 56 is identical with valve 53 except that the diaphragms corresponding to 66 and 67 afford a different area differential. Valve 56 controls flow from passage 54 to passage 21 and produces a smaller proportional reduction, to that brake cylinder pressures limited by it are higher.

Various different load-weighing mechanisms might be used but one (for which no novelty is here claimed) is illustrated in the interests of completeness.

A vertical cylinder 75 is mounted on the spring-supported truck bolster (not shown) and contains a piston 76 whose rod 77 can collide at its upper end with a lug 78 on the truck frame 79 unless the piston is in its lowermost position. The upper end of the cylinder is vented to atmosphere at 81, and there are two side-ports with which the connections 46 and 47 respectively communicate. On an empty car the piston 76 cannot rise high enough to expose either port, but at half load it can rise far enough to expose the port leading to passage 46, and on a loaded car it can go further and also expose the port leading to passage 47.

Recourse is had to the familiar expedient of activating the piston 76 in about the first 50 p. s. i. of a system charge starting with a vented brake pipe, and then causing the piston to lower fully, and remain lowered until brake pipe pressure is once more reduced substantially to atmospheric pressure.

The cycle is controlled by the cut-off valve which is identified by the numeral 82 applied to its housing (see Fig. 2). This housing is continuously connected with the brake pipe by connection 9A and the valve controls communication between 9A and passage 44 which in turn is connected through choke 48 and passage 49 with the cylinder 75 at a point below piston 76. The cut-off valve proper is a poppet valve 83 which closes against its seat 84 in the direction of flow from 9A to passage 44. The valve 83 is biased in a closing direction by a light spring 85. Enclosed in the valve 83 is a cylinder in which a piston 86 (smaller in diameter than the seated area of the valve 83) may reciprocate. Piston 86 is exposed to the pressures above and below valve 83, at least when the valve is closed, and is conneceted to a stem 87 which carrier a collar or encircling flange 88 fixed to it.

A diaphragm 89 is clamped at its periphery between parts of the housing 82 and is subject to pressure in passage 44 acting upward upon it. The upper face of diaphragm 89 is exposed to atmospheric pressure. At its center diaphragm 89 carries hub 91 biased downward (i. e., in the direction to open valve 83) by spring 92 which is stronger than spring 85. Stem 87 is slidable longitudinally through a guideway in hub 91 and is urged downward by a light spring 93 which reacts between a portion of hub 91 and the upper end of stem 87, which has an enlarged head.

A tiltable spring seated vent valve 94 has a stem 95 which projects into the path of flange 88. Tilting of the vent valve cocks it off its seat and opens it, thus venting connection 44.

Assume the brake pipe 9 has been vented and recharging starts. Brake pipe air will flow through 9A, past valve 83 (which is then held open by spring 92) to passage 44. The chokes 45 and 48 assure that latch piston 42 is first forced back, then piston 29 is forced to the right, setting the valve selector to "empty" position. At this time or slightly later, piston 76 will start to rise. The distance it can rise until arrested by stop 78 depends on the load on the car, and determines the position assumed by the selector valve. If neither port 46 or 47 is exposed the selector remains in "empty" position. If 46 only is exposed, piston 37 moves the selector to "intermediate" position. If 47 is also exposed, piston 31 moves the selector all the way to "load" position.

When passage 44 has been charged to about 50 p. s. i. diaphragm 89 will have lifted enough to allow valve 83 to close. This stops the pressure rise in passage 44 but brake pipe pressure continues to rise in 9A. Soon valve 83 is firmly seated by pressure beneath it and piston 86 is subject to an increasing pressure differential, acting upward. Before charging is complete, piston 86 overpowers spring 93, flange 88 engages stem 95 and cocks valve 94 off its seat.

This vents connection 44, causing latch 41 to re-engage, and seating valve 83 so firmly by pressure that it cannot again open until the brake pipe pressure falls below about 5 p. s. i.

The cut-off valve above described is not the invention of this applicant.

The setting of the valve selector either connects the AB valve directly to the brake cylinder, or interposes one or the other proportioning valve with volume 52 connected to draw air from the auxiliary reservoir and compensate for the reduced flows permitted by the proportioning valves.

In the "load" position lobe 27 depressed the left-most stem 24 so that valve 16 is held open. Valves 17 and 18 remain closed. Hence brake-cylinder pipe 14 affords free communication in both directions between the AB valve and the brake cylinder. The AB valve functions normally.

In the empty position, shown in Figure 1, lobe 27 depresses the right-hand stem 24, so that valve 17 is held open. Valves 16 and 18 are closed by their springs and are urged to their seats when fluid pressure is admitted through pipe 14 to chambers 15A and 15B. Assume that under the conditions just stated the AB valve admits air to pipe 14. From pipe 14 air flows past valve 15C to chamber 15B, past valve 17 and then via passage 51 to compensating volume 52 and also to seat 59 of the "empty" proportioning valve 53. The valve disc 58 will lift and air will flow to the brake cylinder 22 via passage 21.

Development of pressure in passage 21, after a delay imposed by valve 69, will cause development of pressure in chamber 68, and eventually the "empty" proportioning valve 53 will act to limit brake cylinder pressure to a low value (by closing valve disc 58 against seat 59). Observe that check valve 55 prevents flow from compensating volume 52 to proportioning valve 56.

In intermediate load position lobe 27 holds valve 18 open. The flow from pipe 14 is through check valve 15C to chamber 15B, past valve 18 (valves 16 and 17 being closed) and then via passage 54 to "intermediate" proportioning valve 56, and past check valve 55 to compensating volume 52. Volume 52 has an open connection to "empty" proportioning valve 53, but this is of no significance because valve 53 will close in response to rising brake cylinder pressure before valve 56 will close in response to rising brake cylinder pressure. The brake cylinder exhaust flow in load setting is via passage 21 past valve 16 and through chamber 15 into the pipe 14. Since chamber 15A is protected by check valve 15C from flow from chamber 15B, the brake cylinder can be exhausted into connection 14 only through check valve 16. When pressure in connection 14 falls, valve 16 opens and brake cylinder pressure immediately starts to reduce. On cars with full load setting, volume 52 will not have been charged, but it will have been charged to a value higher than brake cylinder pressure on cars with either of the other settings. Each charged volume 52 therefore discharges through the valve 58, of the proportioning valve 53, into the brake cylinder. However, the brake cylinder pressure cannot be higher than the fraction of the value of pressure in volume 52 established by the proportioning valve, so that with the reduction of pressure in volume 52 will come a corresponding reduction in brake cylinder pressure until both have been depleted or reached the value held back in connection 14 by a retaining valve.

The particular advantage of the present construction arises during release. A train will have some cars set for load condition, others will be set for empty condition, and still others will be in the intermediate setting.

To avoid the undesirable assumption of excessive and disproportionate braking loads by the empty or lightly loaded cars, particularly during periods of cycling operation with retaining valves set to retain substantial brake cylinder pressure, it is necessary to insure prompt exhaust flow from the brake cylinder after the AB valve has moved to release position. The check valve 15C and the division of chamber 15A from 15B has the effect of preventing exhaust flows from volume 52 from delaying exhaust flow from the brake cylinder 22.

The invention greatly improves release action as compared with the arrangement of the Ross and Safford application, in which the exhaust flow through valves 17 and 18 effectively prevents any exhaust flow through valve 16 until the pressure in volume 52 has been reduced below that in the brake cylinder.

From the statement of operation, just given, it will be apparent that valve 16 functions as a one-way valve (check valve). It closes against flow to the brake cylinder unless held open by the selector, but opens freely at any time to permit exhaust flows. Despite the fact that valves 17 and 18 are structurally identical with valve 16, they function as stop valves which when open afford only flows toward the brake cylinder because the valve 15C prevents exhaust flows through each valve 17 or 18.

What is claimed is:

1. In an empty and load brake the combination of a brake cylinder; a brake controlling valve device having a connection through which it controls pressures in the brake cylinder; and a selector valve mechanism interposed in said connection and adapted to exercise, according to load, a limiting control on brake cylinder pressures, said selector valve mechanism comprising means enclosing a compensating volume; at least one proportioning valve closing in response to brake cylinder pressure and connected to limit flow from the compensating volume to the brake cylinder; at least one normally closed valve controlling communication between said connection and said volume; one-way valve means preventing flow through said normally closed valve toward said connection; a main normally closed valve controlling flow through said connection directly to and from said brake cylinder, said main normally closed valve permitting free flow from the brake cylinder at all times and when closed inhibiting flow toward the brake cylinder; and a selector device responsive to load for opening said normally closed valves selectively.

2. The combination defined in claim 1 in which there are two proportioning valves, each connected with the brake cylinder and characterized by closure in response to different brake cylinder pressures, said valves having distinct communications with the compensating volume, one of which communications comprises a one-way-flow valve; in which there are two normally closed valves in addition to the main normally closed valve, each controlling a different communication between said connection and said volume; and in which the selector valve device serves to open selectively said three normally closed valves.

3. The combination defined in claim 1 in which the two normally closed valves are poppet valves each urged closed by a light biasing spring and each closing against a discharge flow.

4. The combination defined in claim 2 in which the three normally closed valves are poppet valves each urged closed by a light biasing spring and each closing against a discharge flow.

References Cited in the file of this patent
UNITED STATES PATENTS

| | | |
|---|---|---|
| 2,690,932 | Thomas | Oct. 15, 1954 |
| 2,729,515 | Ross et al. | Jan. 3, 1956 |